United States Patent Office 3,464,941
Patented Sept. 2, 1969

3,464,941
STRESS CRACK RESISTANT COMPOSITIONS COMPRISING POLYETHYLENE AND A FATTY ACID SALT OF A DIAMINE
Domas Adomaitis, Chicago, Ill., assignor to Continental Can Company, Inc., New York, N.Y., a corporation of New York
No Drawing. Filed June 28, 1967, Ser. No. 654,305
Int. Cl. C08f 29/04, 37/00
U.S. Cl. 260—23        6 Claims

ABSTRACT OF THE DISCLOSURE

Stress crack resistant polyethylene compositions are prepared by incorporating in the polymer a fatty acid salt of an N-alkyl diaminoalkane. The stress crack resistant polyethylene compositions find useful application in containers for packaging surface active agents, such as soaps and detergents. Such containers are extremely resistant to cracking and rupturing when subjected to external stress conditions.

BACKGROUND OF INVENTION

Field of invention

The present invention relates to ethylene polymer compositions and more particularly to ethylene polymer compositions having improved stress crack resistance.

The prior art

Polyethylene is widely used in the production of wrapping films, bottles, and containers for packaging because it is relatively inert, is tough and flexible, has a low moisture permeability, and can be easily fabricated in quantity at a reasonable cost. However, the packaging industry has reported the failure of polyethylene containers as packaging means for surface active agents, such as soaps and detergents, due to cracking and rupturing, especially when subjected to external stress conditions. In general, this phenomenon is referred to as environmental stress cracking. Stress cracking is particularly undesirable, as it severely shortens the useful life of the polyethylene container. A container once cracked and ruptured is, for all practical purposes, rendered useless. Therefore, environmental stress cracking has been a real problem in the commercial development of polyolefins.

SUMMARY OF INVENTION

In accordance with the present invention, there are provided ethylene polymer compositions which are improved in their environmental stress crack resistance wherein an ethylene polymer having a density between 0.91 and 0.95 is blended with a fatty acid salt of an N-alkyl diaminoalkane.

PREFERRED EMBODIMENTS

The term "ethylene polymer" includes polyethylene and copolymers of ethylene containing minor amounts of other olefin materials, such as propylene and butene-1, having a density between 0.91 and 0.95.

The fatty acid salts which are incorporated in the ethylene polymer to prepare the improved stress crack resistant compositions of the present invention are formed by the direct neutralization under non-dehydrating conditions, i.e., below 200° F. of an N-alkyl diaminoalkane with a higher fatty acid, i.e., fatty acids containing 9 to 20 carbon atoms.

The fatty acid salt may be the mono- and/or di-salt of the N-alkyl diaminoalkane and may be illustrated by the following general formula:

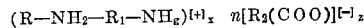

wherein R is an alkyl group of at least 10 carbon atoms and preferably 12 to 20 carbon atoms, $R_1$ is a hydrocarbon diradical, preferably containing 3 carbon atoms, although it may contain 2 to 6 carbon atoms, $R_2$ is a hydrocarbon radical containing 8 to 19 carbon atoms, and $x$, $z$ and $n$ are integers from 1 and 2, and $g$ is an integer from 2 to 3.

Representative examples of those fatty acids include capric acid, erucic acid, stearic acid, oleic acid, ricinoleic acid, linoleic acid, linolenic acid, lauric acid, myristic acid, palmitic acid, mixtures of any two or more of the above-mentioned acids or other acids mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soyabean oil, peanut oil, castor oil, seal oil, whale oil, shark oil, and partially or completely hydrogenated animal and vegetable oils, such as those mentioned.

Any suitable N-alkyl diaminoalkane may be used in forming the fatty acid salt. A particularly preferred N-alkyl diaminoalkane is N-alkyl-1,3-diaminopropane, the alkyl group being derived from tallow. Other preferred N-alkyl-1,3-diaminopropanes comprise those in which the alkyl group is derived from lauric acid, coconut acid, soya fatty acids, etc. These are commercially available at the present time and comprise mixed alkyl-substituted 1,3-diaminopropanes wherein the alkyl group contains about 12 to 20 carbon atoms per group and mostly contain 16 to 18 carbon atoms. However, when desired, the alkyl group of the N-alkyl-1,3-diaminopropanes or other N-alkyl diaminoalkanes may be prepared to contain any number of carbon atoms desired in the alkyl group and thus, is selected from decyl, undecyl, dodecyl, tridecyl, tetradecyl, pentadecyl, hexadecyl, heptadecyl, octadecyl, nonadecyl, iecosyl, etc. It is understood that a mixture of amines containing different alkyl groups may be employed.

While the N-alkyl-1,3-diaminopropanes are preferred, it is understood that other suitable N-alkyl diaminoalkanes may be employed. Illustrative examples include N-alkyl-1,2-diaminoethanes, N-alkyl-1,2-diaminopropane, N-alkyl-1,2-diaminobutanes, N-alkyl-1,3-diaminobutanes, N-alkyl-1,4-diaminobutanes, N-alkyl-1,2-diaminopentanes, N-alkyl-1,3-diaminopentanes, N-alkyl-1,4-diaminopentanes, N-alkyl-1,5-diaminopentanes, N-alkyl-1,2-diaminohexanes, N-alkyl-1,3-diaminohexanes, N-alkyl-1,4-diaminohexanes, N-alkyl-1,5-diaminohexanes, N-alkyl-1,6-diaminohexanes, etc.

The addition of the fatty acid salt to the ethylene polymer can be accomplished in any convenient manner so long as there is obtained a thorough distribution of the fatty acid salt throughout the ethylene polymer.

Various conventional equipment may be used to interknead and mix the ethylene polymer and fatty acid salt and include laboratory extruders, open roll mills, Blow-O-Matic extruders, blow molding machines, Dulmage screw extruders, Banbury mills, and the like. To obtain a suitable mixture for bottle blowing and other uses, the operating pressures in the extruder may vary up to 5000 p.s.i. while affecting the necessary interkneading. The temperatures utilizable depend primarily upon the softening points and melting points of the ethylene polymer and fatty acid salt employed.

The fatty acid salt is added to the ethylene polymer in amounts ranging from about 0.2% to about 2.0% by weight based on the total weight of the salt and the ethylene polymers. It has been found that within this specified range, the ethylene polymer compositions possess excellent environmental stress crack resistance. In the process of the present invention, the effect of the fatty acid salt is peculiar to ethylene polymers which have a density of about 0.91 to 0.95. No improvement has been observed by blending the fatty acid salt with high density linear ethylene polymers, that is, ethylene polymers which have densities of 0.96 and higher.

It is to be understood that minor amounts of other desirable materials, such as high melting waxes, antioxidants, dyes and pigments, lubricants, anti-static agents, and the like may also be present in which do not effect the environmental stress crack resistance of the polyethylene compositions of the present invention.

The following example illustrates the process of the present invention, but is not intended to limit it in any way.

EXAMPLE

Blends of polyethylene and a fatty acid salt containing varying concentrations of the components were prepared by passing the components through a twin extruder at a temperature of 375° F. and a pressure of 500 to 1000 p.s.i.

The blend compositions were used to prepare 8 ounce cylinder bottles on a Blow-O-Matic apparatus in a conventional manner wherein a blow molding apparatus grips and closes the end of an extruded tube. The gripping takes place at a distance corresponding with the desired length of the bottle while surrounding the tube section in the mold which determines the shape. A gas is blown into the grip and otherwise closed mouth of the bottle so that the side walls are expended into conformity with the mold. The extruded tubing was approximately 0.10 inches in thickness with the molding die being 0.5 inches in diameter with a core of 0.35 inch diameter. The complete cycle for molding a single bottle was approximately 23 to 25 seconds.

The stress crack resistance of bottles blown from these compositions was determined by filling the bottles with a liquid detergent called "Chiffon" and then heat sealing, capping, and storing the bottles in a forced circulation air oven at 60° C. until they fail. Failure is indicated by rupture of the bottle wall and subsequent leaking of the contained detergent. Failure time is the average time of 5 bottles in each group to fail.

The polyethylene used in the example is "Alathon 7621," a commercially available polyethylene having a density of 0.95 and a melt index of 0.45.

The fatty acid salt employed was N-tallow-trimethylene diamine dioleate, a commercial product sold under the trade name "Duomeen TDO."

The stress crack resistance of the bottles is summarized in the table below.

TABLE

| Test No. | Amount of fatty acid salt added to polyethylene (percent by weight) | Time in days to failure | | Average (days) |
|---|---|---|---|---|
| | | 1st | Last | |
| 1 | 0.0 | 64 | 196 | 137 |
| 2 | 0.5 | 116 | 401 | 334 |
| 3 | 2.5 | 148 | 353 | 264 |

The results in the above table clearly show the improved stress crack resistance of the polyethylene compositions of the present invention having incorporated therein a fatty acid salt of an N-alkyl diaminoalkane. The control test (Test No. 1) of bottles blown from polyethylene composition having no fatty acid salt incorporated therein exhibits materially worse stress crack resistance than bottles blown from polyethylene compositions of the present invention (Test Nos. 2 & 3).

Results similar to the foregoing may also be obtained when any of the other mentioned fatty acid salts are incorporated in ethylene polymers in place of oleic acid-N-tallow-1,3-diaminopropane salt set forth in the example above.

What is claimed is:
1. A composition of matter having improved stress crack resistance which comprises a mixture of an ethylene polymer selected from a group consisting of polyethylene and copolymers of ethylene containing minor amounts of another olefin having a density between 0.91 and 0.95, and having incorporated therein about 0.2 to about 2.0%, based on the weight of the polymer, of a fatty acid salt of an N-alkyl diaminoalkane having the general formula:

$$(R-NH_2-R_1-NH_g)^{[+]}{}_x \quad n[R_2(COO)]^{[-]}{}_x$$

wherein R is an alkyl group containing 10 to 20 carbon atoms, $R_1$ is a hydrocarbon diradical containing 2 to 6 carbon atoms, $R_2$ is a hydrocarbon radical containing 8 to 19 carbon atoms, $x$ $z$ and $n$ are integers from 1 to 2 and $g$ is an integer from 2 to 3.

2. The composition of claim 1 wherein the ethylene polymer is polyethylene.

3. The composition of claim 1 wherein the fatty acid salt is a higher fatty acid salt of N-alkyl-1,3-diaminopropane the alkyl group being derived from tallow.

4. The composition of claim 1 wherein the fatty acid constituent of the salt is oleic acid.

5. The composition of claim 1 wherein the fatty acid salt is N-tallow-trimethylene diamine dioleate.

6. The composition of claim 1 wherein the fatty acid salt is incorporated in the ethylene polymer composition in an amount ranging from about 0.2 to 2.0 percent based on the weight of the composition.

References Cited

UNITED STATES PATENTS

| 2,765,293 | 10/1956 | Happoldt | 260—45.9 |
| 2,953,541 | 9/1960 | Pecha et al. | 260—32.6 |
| 2,994,675 | 8/1961 | Haward et al. | 260—23 |
| 3,025,239 | 3/1962 | Sheldahl | 260—404.5 |
| 3,234,176 | 2/1966 | Bata et al. | 260—38 |
| 3,350,346 | 10/1967 | Maxson | 260—45.7 |

DONALD E. CZAJA, Primary Examiner

R. A. WHITE, Assistant Examiner

U.S. Cl. X.R.

260—88.2, 94.9